United States Patent
Lu et al.

(10) Patent No.: US 11,751,018 B1
(45) Date of Patent: Sep. 5, 2023

(54) AIRPLANE MODE TOGGLE BASED ON IMS WATCHDOG TIMER

(71) Applicant: T-Mobile USA, Inc., Bellevue, WA (US)

(72) Inventors: Kun Lu, Bellevue, WA (US); Hsin Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 103 days.

(21) Appl. No.: 17/392,059

(22) Filed: Aug. 2, 2021

(51) Int. Cl.
| | | |
|---|---|---|
| *H04W 4/029* | (2018.01) | |
| *H04M 1/72454* | (2021.01) | |
| *H04L 65/1016* | (2022.01) | |
| *H04M 1/72463* | (2021.01) | |

(52) U.S. Cl.
CPC ......... *H04W 4/029* (2018.02); *H04L 65/1016* (2013.01); *H04M 1/72454* (2021.01); *H04M 1/724634* (2022.02)

(58) Field of Classification Search
CPC .............. H04W 4/029; H04L 65/1016; H04M 1/72454; H04M 1/72463; H04M 1/724634
See application file for complete search history.

(56) References Cited

U.S. PATENT DOCUMENTS

| | | | |
|---|---|---|---|
| 8,788,655 B2 * | 7/2014 | Dare | H04L 67/04 709/224 |
| 10,244,380 B2 | 3/2019 | Manalo et al. | |
| 2002/0173308 A1 * | 11/2002 | Dorenbosch | H04M 15/8083 455/435.1 |
| 2014/0057663 A1 * | 2/2014 | Liu | H04W 4/029 455/456.4 |
| 2014/0308940 A1 | 10/2014 | Kwon | |
| 2015/0056974 A1 * | 2/2015 | Kim | H04M 1/72448 455/418 |
| 2016/0342188 A1 * | 11/2016 | Varga | G06F 1/266 |
| 2021/0160774 A1 * | 5/2021 | Nagar | H04W 52/0241 |

FOREIGN PATENT DOCUMENTS

EP 3384656 B1 * 4/2021 ....... H04L 29/06197

* cited by examiner

*Primary Examiner* — Farid Seyedvosoghi
(74) *Attorney, Agent, or Firm* — Lee & Hayes, P.C.

(57) ABSTRACT

A connection between a user equipment (UE) and an IP Multimedia Subsystem (IMS) can become disrupted due to network-side issues with the IMS, an access network, or a core network. The UE can initiate a watchdog timer to determine when a previously-established IMS connection may be unusable due to such a network-side issue. If the watchdog timer expires, for example because the IMS does not reply to a message sent by the UE before the watchdog timer expires, the UE can toggle an airplane mode on and off. Toggling airplane mode on and off can deactivate and then re-activate a transmission interface of the UE, and cause the UE to establish a new usable connection with the IMS that may not be affected by the network-side issue that disrupted the previously-established IMS connection.

17 Claims, 4 Drawing Sheets

AIRPLANE MODE TOGGLE BASED ON IMS WATCHDOG TIMER

BACKGROUND

A user equipment (UE), such as a mobile phone, can connect to a telecommunication network and register with an Internet Protocol (IP) Multimedia Subsystem (IMS). The IMS can include network elements that can set up and/or implement communication sessions for voice calls, video calls, messaging, or other services.

For example, once a UE has registered with the IMS, the UE can make an outgoing voice call in part by requesting voice call services from the IMS. Similarly, the UE can receive an incoming voice call in part based on information provided by the IMS to the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
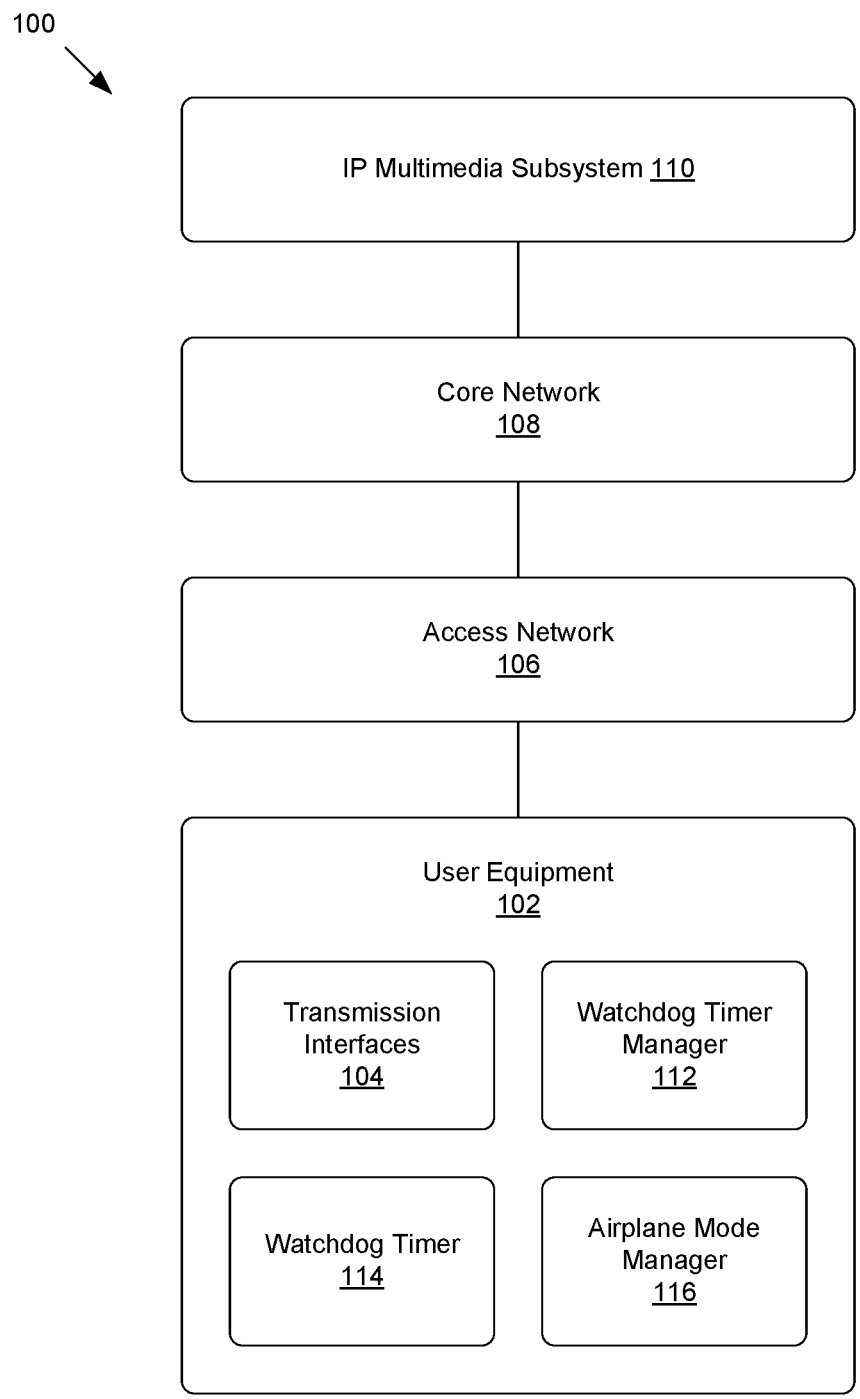
FIG. 1 shows an example of a network environment in which a UE can connect to a telecommunication network.

A UE can connect to a telecommunication network via a base station, or other access point, that can link the UE to a core network of the telecommunication network. The core network can also link the UE to an IMS that can provide services to the UE, such as voice call services, video call services, messaging services, and/or other types of IMS services. The IMS can include network elements, such as Call Session Control Functions (CSCFs) and application servers, that can be configured to set up and/or manage communication sessions for the UE, and/or perform other operations associated with the UE.

For example, when the UE attaches to the telecommunication network, the UE can send a register message to a Proxy CSCF (P-CSCF) in the IMS to initiate an IMS registration process. The P-CSCF can forward the register message to an Interrogating CSCF (I-CSCF), which can assign the UE to a Serving CSCF (S-CSCF). The S-CSCF can act as a registrar for the IMS, and can authenticate the UE and complete IMS registration of the UE. The S-CSCF can also select one or more application servers for the UE, such as an application server that can implement voice call services or other types of services for the UE. After the UE has registered with the IMS, elements of the IMS can route messages and perform other operations to implement voice calls for the UE, implement other services for the UE, and/or perform other types of operations associated with the UE.

In some situations, a network-side issue can at least temporarily disrupt an IMS connection associated with the UE, after the UE has registered with the IMS. In some examples, such an IMS connection disruption may occur because an IMS network element, associated with the UE during IMS registration, becomes overloaded, goes offline, or experiences another error or issue that prevents the IMS network element from performing operations associated with the UE 102. In other examples, an element of an access network or a core network may similarly overloaded, go offline, or experience another error or issue that prevents the UE from using an established IMS connection that extends between the UE and the IMS through the access network and core network. In these examples, an issue with the access network or the core network may disrupt the ability of the UE to use the IMS connection. In still other examples, other types of errors or issues may disrupt the ability of the UE to use the IMS connection, such as a handover error at a base station, a radio layer signaling error, an error with a transport link between an access network and a core network or the core network and the IMS, and/or any other type of error or issue.

Conventionally, UEs are often not configured to determine when an established IMS connection has been disrupted due to a network-side issue, or may be configured to wait until the network-side issue has been resolved to continue using the IMS connection. For example, a UE may be configured to expect a response from the IMS to a Session Initiation Protocol (SIP) message sent by the UE to the IMS. If the UE does not receive the expected response, the UE may be configured to periodically retry sending the SIP message until the IMS does return a response to the SIP message. In situations in which a network-side issue is preventing the SIP message from being delivered to the IMS and/or processed by the IMS, the UE may continue re-sending the SIP message periodically until the network-side issue is resolved. In some cases, it may take a relatively long among of time for such a network-side issue to be resolved, during which time the UE does not have a usable IMS connection.

As an example, a UE may be configured to send a SIP BYE message to the IMS, and expect a "200 OK" response from the IMS to the SIP BYE message. However, a network-side issue may prevent the IMS from receiving or processing the SIP BYE message, such that the IMS does not send a "200 OK" response back to the UE. The network-side issue may persist for five minutes before being resolved. Accordingly, during this five-minute period, the UE may retry sending the SIP BYE message multiple times, before the network-side issue is finally resolved and the IMS is able to respond to the SIP BYE message with the "200 OK" response expected by the UE.

Although, in this example, the IMS connection may recover after five minutes once the network-side issue has been resolved, the UE can be without a usable IMS connection during that five-minute period. For instance, if the UE attempted to initiate a new outgoing call during the five-minute period, the network-side issue that prevented the SIP BYE message from being processed by the IMS can also prevent the IMS from receiving or processing a SIP INVITE message from the UE that requests initiation of the new outgoing call. Accordingly, the outgoing call can fail due to the network-side issue. Similarly, if an incoming call arrives for the UE during the five-minute period, the network-side issue can also prevent the IMS from informing the UE about the incoming call, and the UE may be able to receive or answer the incoming call.

Most UEs are not configured to determine when network-side issues may be disrupting established IMS connections, or to inform users of the UEs that such network-side issues may impact the availability of IMS services. This can be frustrating for users of the UEs. For instance, due to a network-side issue that disrupts an IMS connection associated with a UE, an outgoing call attempted by a user of that UE may fail, as discussed above. Similarly, such a network-side issue may prevent the IMS from informing the UE of an incoming call, as discussed above. In such cases, the UE may not ring because the IMS is not able to inform the UE of the incoming call, and the incoming call may go straight to voicemail. A user of the UE may be frustrated or confused when a voicemail notification later appears on the UE, when the UE never rang to inform the user of an incoming call.

Some conventional UEs may be configured to eventually attempt to re-register with the IMS, for example if the IMS does not respond to messages sent by the UEs after a threshold period of time. However, such a UE may attempt to send a new IMS registration message or re-registration message via the same network elements of the access network, core network, and/or IMS that are already associated with the UE and/or the previously-established IMS connection. If any of those network elements are experiencing the network-side issue that disrupted the previously-established IMS connection, the network elements may also be unable to route or process the new IMS registration message or re-registration message from the UE, and the UE may not be able to re-register with the IMS until the network-side issue is resolved.

The systems and methods described herein allow a UE to toggle an airplane mode on and off locally to regain a usable IMS connection in situations in which the UE determines, based on the expiration of a watchdog timer, that an existing IMS connection may have been disrupted by a network-side issue. Although the UE may not be able to determine what type of network-side issue has occurred, toggling airplane mode on and off can cause the UE to disconnect and then reconnect to a telecommunication network such that a new IMS registration process can occur. The new IMS registration process can establish a new IMS connection for the UE that is not affected by the network-side issue that disrupted the previous IMS connection and that may still be ongoing. As an example, if an S-CSCF associated with the UE for the previous IMS connection has failed, the UE can, upon reconnecting to the telecommunication network after toggling airplane mode on and off, become associated with a different S-CSCF that has not failed and is available to provide IMS services to the UE. Accordingly, the UE can toggle airplane mode on and off to regain a usable IMS connection more quickly than waiting for a network-side issue to be resolved.

Example Environment

FIG. 1 shows an example 100 of a network environment in which a UE 102 can connect to a telecommunication network to engage in communication sessions for voice calls, video calls, messaging, data transfers, and/or any other type of communication. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

Figure 3:
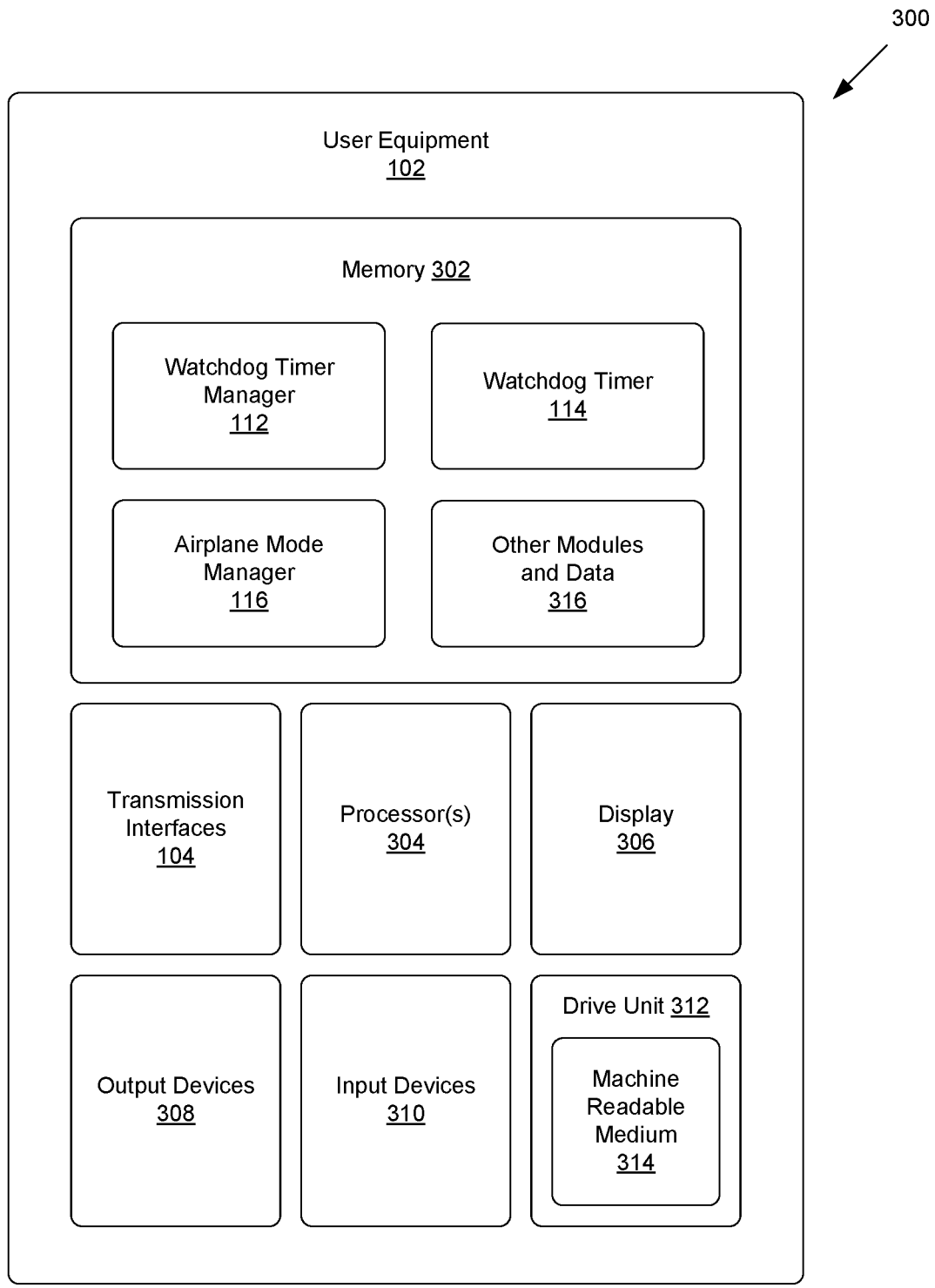
FIG. 3 shows an example of system architecture for the UE.

The UE 102 can include one or more transmission interfaces 104 that the UE 102 can use to wirelessly connect to a base station, or another wireless access point, through which the UE 102 can communicate with the telecommunication network. For example, the transmission interfaces 104 of the UE 102 can include one or more radio interfaces, transceivers, modems, interfaces, antennas, and/or other components that perform or assist in exchanging communications, such as radio frequency (RF) communications, with one or more base stations or other access points. Other elements of an example system architecture for the UE 102 are shown in FIG. 3, and are described in detail below with reference to that figure.

The telecommunication network can have, or be associated with, an access network 106. For example, the access network 106 can be a radio access network (RAN). The access network 106 can include one or more base stations, or other access points, that the UE 102 can connect to via the transmission interfaces 104.

The telecommunication network can also have a core network 108. The access network 106 can be linked to the core network 108, such that the UE 102 can exchange data with the core network 108 via a connection with the access network 106. The core network 108 can be linked to one or more other networks, such as an IMS 110, the Internet, and/or other data networks. Accordingly, the UE can connect to the IMS 110 via a connection that extends through the access network 106 and the core network 108.

The IMS 110 can include elements that are configured to set up and/or manage communication sessions for the UE 102 and other UEs, such as sessions for voice calls, video calls, messaging, or other types of communications. For example, the IMS 110 can include Call Session Control Functions (CSCFs), including Proxy CSCFs (P-CSCFs), Interrogating CSCFs (I-CSCFs), and Serving CSCFs (S-CSCFs), that can register the UE 102 with the IMS 110, route messages associated with the UE 102, and/or perform other operations to implement services for the UE 102. As another example, the IMS 110 can include application servers that can implement services for the UE 102, such as a telephony application server (TAS) that is configured to implement voice call services, or a Rich Communication Services (RCS) server that is configured to implement RCS messaging services.

The UE 102, the access network 106, the core network 108, and/or the IMS 110 can be compatible with one or more types of radio access technologies, wireless access technologies, protocols, and/or standards. Such radio access technologies, wireless access technologies, protocols, and/or standards can include fifth generation (5G) New Radio (NR) technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology or wireless access technology.

In some examples, network elements can be based on LTE technology. For instance, the access network 106 can be an LTE access network known as an Evolved UMTS Terrestrial Radio Access Network (E-UTRAN), and can include one or more LTE base stations known as evolved Node Bs (eNBs). The transmission interfaces 104 of the UE 102 can support LTE, such that the UE 102 can wirelessly connect to one or more eNBs. The core network 108 can be an LTE packet core network, known as an Evolved Packet Core (EPC). In these examples, the IMS 110 can be configured to implement LTE voice services known as Voice over LTE (VoLTE) services.

In other examples, network elements can be based on 5G technology. For instance, the access network 106 can be a 5G access network that includes one or more 5G base stations known as gNBs, and the transmission interfaces 104 of the UE 102 can support 5G such that the UE 102 can wirelessly connect to one or more gNBs. The core network 108 can also be a 5G core network, and/or the IMS 110 can be configured to implement 5G voice services known as Voice over New Radio (VoNR) services.

Different elements of the telecommunication network may be associated with different types or generations of wireless technologies. For example, a 5G access network can be linked to an LTE core network, or an LTE access network can be linked to a 5G core network. The transmission interfaces 104 of the UE 102 can support LTE, 5G, WiFi®, and/or other wireless technologies, such that the UE 102 can reach the core network 108 through a connection to an LTE gNB, a connection to a 5G gNB, and/or a connection to a WiFi® access point that is connected to the core network 108 via the Internet.

The UE 102 can connect to the telecommunication network by establishing a wireless connection with a base station or access point of the access network 106, which can in turn connect the UE 102 to the core network 108. A communication session, such as a Protocol Data Unit (PDU) session or Packet Data Network (PDN) connection, can also be established through the access network 106 and the core network 108 for the UE 102. For example, a PDU session may be established between the UE 102 and a user plane function (UPF) of a 5G core network. The PDU session may be associated with an N3 tunnel that extends between the UPF and a base station of the access network 106, and one or more data radio bearers that extend between the base station and the UE 102.

The UE 102 can use such a PDU session, or other communication session established for the UE 102 through the access network 106 and the core network 108, to exchange data with the IMS 110. For example, the UE 102 can use a PDU session, PDN connection, or other type of communication session to exchange messages, such as SIP messages, with the IMS 110 during and/or after an IMS registration process.

To register with the IMS 110, the UE 102 can send a registration message, such as a SIP REGISTER message, to a P-CSCF in the IMS 110. The P-CSCF can forward the registration message to an I-CSCF, which can assign the UE to an S-CSCF selected by the I-CSCF. The S-CSCF can authenticate the UE, complete registration of the UE with the IMS, select application servers for the UE 102, and/or perform other operations associated with the UE 102. After the UE 102 has been registered with the IMS 110, the UE 102 and the IMS 110 can use other types of messages, such as SIP INVITE messages and other SIP messages, to request and implement voice calls and other services via the IMS 110.

However, after the UE 102 has registered with the IMS 110, network-side issues with one or more of the access network 106, the core network 108, or the IMS 110 may disrupt the IMS connection between the UE 102 and the IMS 110. For example, an issue with an element of the access network 106 or the core network 108 may prevent messages sent from the UE 102 via an established PDU session from being delivered to the IMS 110, and/or prevent messages sent by the IMS 110 from reaching the UE 102 via the established PDU session. As another example, an issue with a CSCF, application server, or other element of the IMS 110 that was associated with the UE 102 during IMS registration may prevent the IMS 110 from implementing services for the UE 102.

Because such a network-side issue may occur remotely from the UE 102 in the access network 106, the core network 108, or the IMS 110, the UE 102 may be unaware of the network-side issue. The UE 102 may accordingly be unaware when a previously-established IMS connection has been disrupted and/or is unusable due to a network-side issue, and may continue to attempt to use the IMS connection normally. For example, the UE 102 may attempt to send a SIP message to the IMS 110. However, due to a network side issue with the access network 106, the core network 108, and/or the IMS 110, the IMS 110 may not receive the SIP message or may not be able to process the SIP message. If the UE 102 sends a message to the IMS 110 and does not receive an expected response to that message, the UE 102 can be configured to occasionally or periodically retry sending the message to the IMS 110, even though the previously-established IMS connection may be disrupted and/or unusable due to an ongoing network-side issue.

To prevent the UE 102 from continually trying to use the previously-established IMS connection in situations in which the IMS connection may have been disrupted by a network-side issue, a watchdog timer manager 112 of the UE 102 can initiate a watchdog timer 114 when the UE 102 attempts to send a message to the IMS 110 via the previously-established IMS connection. The watchdog timer 114 can be a service-based timer that runs to determine whether the UE 102 does, or does not, have access to services via the IMS 110. The watchdog timer 114 can be set to two minutes, three minutes, or any other predetermined or configurable period of time. If the UE 102 does not receive a response from the IMS 110 before the watchdog timer 114 expires, the watchdog timer manager 112 can determine that a network-side issue may be preventing the IMS 110 from responding to the UE 102, and thus that the previously-established IMS connection may currently be disrupted and/or unusable.

If the watchdog timer 114 expires, the watchdog timer manager 112 can instruct an airplane mode manager 116 of the UE 102 to at least briefly toggle an airplane mode of the UE 102 on and off. Airplane mode may also be referred to as "flight mode," "offline mode," or as other terms. Use of airplane mode by the UE 102 does not depend on the UE 102 being on an airplane, in an airport, or in flight. For example, airplane mode can be activated on the UE 102 when the UE 102 is at any location, including during situations when the UE 102 is not in proximity to an airplane or airport, and/or is not in flight on an airplane.

Turning airplane mode on can cause some or all of the transmission interfaces 104 of the UE 102 to power off, shut down, or otherwise deactivate, while other elements of the UE 102 can remain active. Turning airplane mode off can cause the transmission interfaces 104 to power on or otherwise re-activate, and the UE 102 can begin establishing a new connection to the telecommunication network.

Toggling airplane mode on and then off in response to an expiration of the watchdog timer 114 can accordingly cause the UE 102 to establish a new connection to the telecommunication network, as if the UE 102 had been entirely powered-off and had just been turned on. For instance, upon turning airplane mode off, the transmission interfaces 104 of the UE 102 can attach to a base station or other access point of the access network 106. Additionally, upon turning airplane mode off, the UE 102 can also establish a new PDU session, PDN connection, or other communication session through the core network 108, and the UE 102 can also freshly register with the IMS 110 by initiating a new IMS registration procedure.

As a non-limiting example, when the UE 102 is attached to a particular gNB of the access network 106, is associated with particular elements of the core network 108, and is associated with particular elements of the IMS 110 due to a previous IMS registration, the UE 102 can disconnect from the gNB when airplane mode is turned on at the UE 102. When airplane mode is turned off and the transmission interfaces 104 re-activate, the UE 102 can attach to the same, or a different, gNB in the access network 106. The UE 102 can also connect again to the core network 108 and, for example, become freshly associated with the same, or different, elements of the core network 108. For instance, if the UE 102 had previously been associated with a particular UPF instance in the core network 108, the UE 102 may become associated with a different UPF instance in the core network 108 after the UE 102 toggles airplane mode on and off. The UE 102 can additionally initiate a new IMS registration procedure, during which the UE 102 may become associated with the same, or different, elements of the IMS 110. For instance, if the UE 102 had previously been registered with a particular S-CSCF in the IMS 110, the IMS 110 may cause the UE 102 to become registered with a different S-CSCF in the IMS 110 after the UE 102 toggles airplane mode on and off.

In many situations in which a network-side issue has disrupted a previously-established IMS connection for the UE 102, toggling airplane mode on and off at the UE 102 can cause the UE 102 to establish a new and usable IMS connection. For example, a particular network element of the access network 106, the core network 108, or the IMS 110 that was associated with the previously-established IMS connection may have gone offline, and thereby caused the previously-established IMS connection to become at least temporarily unusable by the UE 102. However, by toggling airplane mode on and off, the UE 102 may establish a new IMS connection that is not associated with the offline network element, and that can be used by the UE 102 to access IMS services. Accordingly, rather than waiting for the network-side issue to be resolved remotely, the UE 102 can toggle airplane mode on and off locally to more quickly regain a useable IMS connection.

The watchdog timer manager 112 can be a software or firmware element that executes on the UE 102. For example, the watchdog timer manager 112 may be a component of an operating system of the UE 102, a component of firmware of the UE 102, an independent application that executes on the UE 102, a component of carrier settings or carrier software associated with an operator of the telecommunication network, or any other type of computer-executable component. The watchdog timer manager 112 can be configured to monitor messages sent by the UE 102 to the IMS 110, and/or messages received by the UE 102 from the IMS 110, to identify situations in which to initiate the watchdog timer 114. For example, the watchdog timer manager 112 can execute at, or have visibility into, an application layer, a transport layer, user plane elements, control plane elements, and/or other elements of an IMS stack at which the UE 102 sends and receives SIP messages to communicate with the IMS 110.

The airplane mode manager 116 can also be a software or firmware element that executes on the UE 102. In some examples, the airplane mode manager 116 can be an operating system component that manages the state of the transmission interfaces 104, and can instruct the UE 102 to activate or deactivate the transmission interfaces 104. For example, an operating system can allow a user of the UE 102 to provide user input, via a user interface, that manually instructs the airplane mode manager 116 to turn airplane mode on or off. However, the airplane mode manager 116 can also have an Application Programming Interface (API) or other interface by which the watchdog timer manager 112 can instruct the airplane mode manager 116 to toggle airplane mode on and off automatically, without manual user input.

The watchdog timer manager 112 can be configured to set and begin the watchdog timer 114 when the UE 102 attempts to send a message to the IMS 110. If the UE 102 receives a response to that message from the IMS 110 before the watchdog timer 114 expires, such as a responsive SIP message containing data for the UE, or a "200 OK" message or other receipt confirmation message, the watchdog timer manager 112 can stop and/or reset the watchdog timer 114. However, if the UE 102 does not receive a response to the sent message from the IMS 110 by the time the watchdog timer 114 expires, the watchdog timer manager 112 can request that the airplane mode manager 116 toggle airplane mode on and off at the UE 102 to trigger the establishment of a new IMS connection.

The watchdog timer 114 can, in some examples, be set for a shorter period of time than a longer IMS connection disruption duration that may be more likely to be noticed by a user. For example, a user of the UE 102 may be relatively likely to perceive failures of incoming and outgoing calls, or other IMS services, due to network-side issues that disrupt IMS connections for periods of five minutes, ten minutes, or other relatively long periods of time. However, the watchdog timer 114 can be set for a shorter period of time, such as two minutes, during which it may be less likely that the user attempts to use an IMS service and may notice IMS service failures due to network-side issues.

In some examples, the watchdog timer manager 112 can be configured to initiate the watchdog timer 114 when the UE 102 initially attempts to send a message to the IMS 110. In other examples, the watchdog timer manager 112 can be configured to initiate the watchdog timer 114 when the UE 102 has tried re-sending a message to the IMS 110 at least a threshold number of times. As an example, the watchdog timer manager 112 can determine that the UE 102 initially attempts to send a message to the IMS 110 at a first time, and then attempts to re-send the same message to the IMS 110 at a second time because the UE 102 has not received a response from the IMS 110 by the second time. In this example, the watchdog timer manager 112 may be configured to not start the watchdog timer 114 at the first time, but may be configured to start the watchdog timer 114 at the second time upon the first attempt to re-send the message to the IMS 110.

The watchdog timer manager 112 can initiate the watchdog timer 114 by determining whether the IMS 110 has responded to a message sent by the UE 102. In some examples, the UE 102 may send such a message as part of normal operations of the UE 102 and/or interactions with the IMS 110, for instance to request, engage in, or terminate IMS services. However, in other examples, the watchdog timer manager 112 can also be configured to cause the UE 102 to periodically or occasionally send a heartbeat message, or other status message, to the IMS 110 in situations in which the UE 102 has not attempted to communicate with the IMS 110 normally for at least a threshold period of time. In some examples, the heartbeat message can be addressed to a TAS that is configured to implement voice services for the UE 102, as such a heartbeat message can verify that the UE 102 has access to outgoing and incoming voice calls via the IMS 110 if the TAS responds. The watchdog timer manager 112 can initiate the watchdog timer 114 in association with the UE 102 sending such a heartbeat message or status message, and can determine if the IMS 110 responds to the heartbeat message or status message before the watchdog timer 114 expires.

For example, if the UE 102 has not attempted to send a message to the IMS 110, and/or has not received a message from the IMS 110, for a least a minute or another predetermined period of time as part of normal operations, the watchdog timer manager 112 can cause the UE 102 to send a heartbeat message to the IMS 110 and can initiate the watchdog timer 114. If the IMS 110 receives the heartbeat message, the IMS 110 can return a confirmation message that confirms, to the UE 102, that the heartbeat message was received. Such a confirmation message can indicate that the UE 102 has an active and usable IMS connection, and the watchdog timer manager 112 can stop the watchdog timer 114. However, if the IMS 110 does not return a response to the heartbeat message before the watchdog timer 114 expires, the lack of a response from the IMS 110 may indicate that the IMS connection has been disrupted, and the watchdog timer manager 112 can trigger the establishment of a new IMS connection by instructing the airplane mode manager 116 to toggle airplane mode on and off at the UE 102.

The airplane mode manager 116 can, based on an instruction from the watchdog timer manager 112 in response to an expiration of the watchdog timer 114, toggle an airplane mode of the UE 102 on and then off. The airplane mode manager 116 can be configured to briefly turn airplane mode on, for at least long enough for the transmission interfaces 104 to deactivate and disconnect from the telecommunication network. Once the transmission interfaces 104 have deactivated and disconnected from the telecommunication network, the airplane mode manager 116 can turn airplane mode off, such that the transmission interfaces 104 can re-activate and re-connect to the telecommunication network, and the UE 102 can establish a new IMS connection. In some examples, the airplane mode manager 116 can cause the UE 102 to be in airplane mode for a relatively brief period of time, such as a second or less, or any other period of time sufficient for the transmission interfaces 104 to fully deactivate and disconnect before re-activating and establishing a new network connection.

In some examples, the airplane mode manager 116 can be configured to avoid updating a user interface of the UE 102 to indicate when airplane mode has been automatically turned on briefly and temporarily based on an instruction from the watchdog timer manager 112. For example, if the watchdog timer manager 112 determines that the watchdog timer 114 has expired and instructs the airplane mode manager 116 to toggle airplane mode on and off, the airplane mode manager 116 can cause the UE 102 to avoid displaying an airplane mode icon in a user interface while the UE 102 is briefly in airplane mode, and/or avoid changing a network connection status indicator in the user interface while the UE 102 is briefly in airplane mode. Accordingly, the UE 102 briefly switching to airplane mode automatically, based on an expiration of the watchdog timer 114, can be substantially imperceptible to a user of the UE 102.

Additionally, in some examples, the watchdog timer manager 112 and/or airplane mode manager 116 can be configured to wait to toggle airplane mode until the UE 102 is not actively using another type of data connection that may be impacted by airplane mode. For example, if a user is actively using the UE 102 to download data or stream media via an Internet connection, separate from the IMS connection, the airplane mode manager 116 may wait until the download is complete, or until a sufficient amount of streaming media has been buffered, to briefly toggle airplane mode on and off. Accordingly, the airplane mode manager 116 can avoid impacting a user experience of the user by waiting until a brief background activation of airplane mode may be unlikely to be noticed by the user. In other examples, if an active data connection is using a Bluetooth® transmission interface, or other one of the transmission interfaces 104 that may not be associated with an IMS connection, the airplane mode manager 116 can avoid deactivating that active transmission interface when toggling airplane mode on and off, but deactivate and re-activate one or more other transmission interfaces 104 in order to trigger the establishment of a new IMS connection.

The watchdog timer manager 112 and/or airplane mode manager 116 can, in some examples, be configured with an airplane mode toggle attempt limit. The airplane mode toggle attempt limit can indicate a maximum number of times to toggle airplane mode at the UE 102 to trigger new attempts to establish a usable IMS connection after an expiration of the watchdog timer 114. For instance, the airplane mode toggle attempt limit can indicate that the airplane mode manager 116 should toggle airplane mode on and off no more than one time, two times, three times, or any other number of times after an expiration of the watchdog timer 114. If toggling airplane mode one or more times, up to the airplane mode toggle attempt limit, does not lead to the establishment of a usable IMS connection, the UE 102 can be configured to stop toggling airplane mode, and the UE 102 can attempt to re-establish an IMS connection via other processes. For instance, the UE 102 may be configured to periodically send IMS registration messages that, once a network-side issue has been resolved, may eventually be accepted by the IMS 110.

For example, if the watchdog timer 114 expires because a network-side issue may be disrupting a previously-established IMS connection, the watchdog timer manager 112 can instruct the airplane mode manager 116 to toggle airplane mode on and off one or more times (up to the airplane mode toggle attempt limit), to determine if toggling airplane mode allows the UE 102 to regain a usable IMS connection relatively quickly. However, if toggling airplane mode one or more times (up to the airplane mode toggle attempt limit) does not result in a usable IMS connection for the UE 102, the watchdog timer manager 112 can stop instructing the airplane mode manager 116 to toggle airplane mode. The UE 102 can instead follow other processes to eventually re-establish an IMS connection once the network-side issue has been resolved.

In other examples, if an initial attempt to trigger the establishment of a new IMS connection by toggling airplane mode on and off is unsuccessful, the watchdog timer manager 112 and/or airplane mode manager 116 can be configured to reattempt toggling airplane mode at one or more later times according to an exponential backoff scheme, or other schedule. For example, if a first airplane mode toggle does not result in a new usable IMS connection, the airplane mode manager 116 can toggle airplane mode at the UE 102 a second time one minute later. If that second airplane mode toggle is still not successful at leading to a new usable IMS connection, the airplane mode manager 116 can toggle airplane mode at the UE 102 a third time two minutes later. The airplane mode manager 116 can continue toggling airplane mode one or more additional times (up to an airplane mode toggle attempt limit, for example) to trigger additional attempt to establish a new usable IMS connection.

Overall, if a network-side issue has disrupted a previously-established IMS connection for the UE 102, in many situations toggling airplane mode on and off at the UE 102 can cause the UE 102 to establish a new and usable IMS connection more quickly than waiting for the network-side issue to be resolved. For example, if a first network element associated with the previously-established IMS connection is overloaded, or is experiencing an error or other issue that is disrupting the UE's ability to use the previously-established IMS connection, toggling airplane mode on after an expiration of the watchdog timer 114 can temporarily disconnect the UE 102 from the telecommunication network such that the UE 102 becomes disassociated with the first network element. By then toggling airplane mode off, the UE 102 can reconnect to the telecommunication network, and establish a new IMS connection that may be associated with a second network element instead of the first network element. Accordingly, the UE 102 can establish a new usable IMS connection, associated with the second network element, more quickly than waiting for the issue with the first network element to be resolved.

Toggling airplane mode automatically at the UE 102 after the watchdog timer manager 112 determines, based on an expiration of the watchdog timer 114, that a network-side issue may be disrupting a previously-established IMS connection can cause the UE 102 to regain a usable IMS connection more quickly than waiting for the network-side issue to be resolved. Automatically toggling airplane mode at the UE 102 after an expiration of the watchdog timer 114 can accordingly decrease periods of time during which the UE 102 may not have a usable IMS connection, and thus decrease the likelihood that a user of the UE 102 will notice the IMS connection disruption. For example, automatically toggling airplane mode at the UE 102 after an expiration of the watchdog timer 114 can shorten periods of time during which network-side issues can disrupt an IMS connection and lead to failed outgoing calls, missed incoming calls, and/or other IMS service failures, and thereby lead to an improved user experience.

Figure 2:
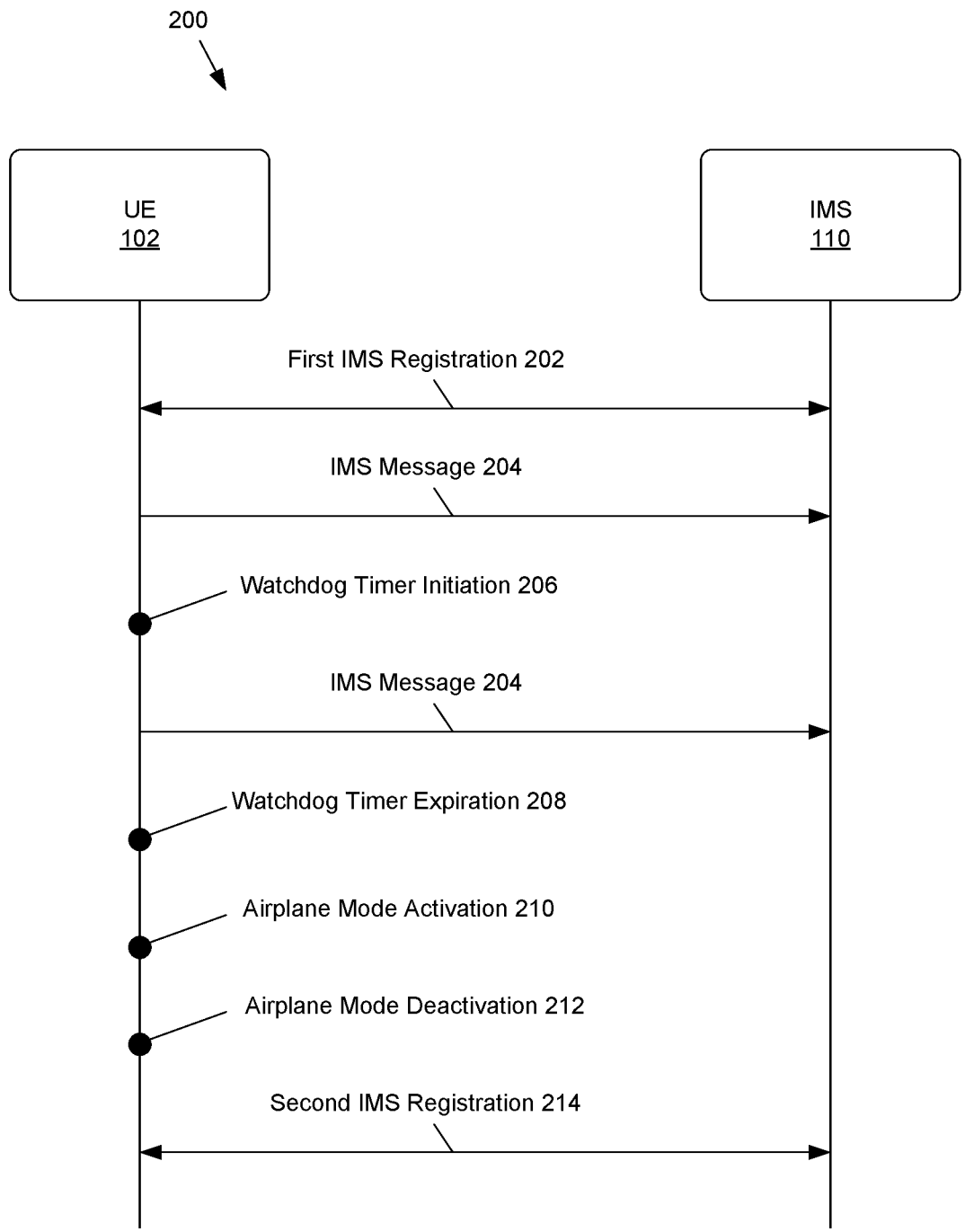
FIG. 2 shows a sequence diagram of operations associated with a watchdog timer that can cause the UE to regain a usable IMS connection by activating airplane mode and deactivating airplane mode.

FIG. 2 shows a sequence diagram 200 of operations associated with the watchdog timer 114 that can cause the UE 102 to regain a usable IMS connection by activating airplane mode and deactivating airplane mode. The UE 102 can initially engage in a first IMS registration 202 to register with the IMS 110. The first IMS registration 202 can be associated with a first IMS connection, and may cause the UE 102 to become associated with a particular P-CSCF and a particular S-CSCF in the IMS 110. The first IMS connection can also be associated with a first communication session, such as a PDU session or PDN connection, in the access network 106 and/or the core network 108.

The UE 102 can attempt to send an IMS message 204, such as a SIP message, to the IMS 110 in association with the first IMS connection. The UE 102 can also perform a watchdog timer initiation 206 to initiate the watchdog timer 114, based on sending the IMS message 204. As discussed above, the watchdog timer 114 may be set to a two-minute time period, or any other period of time. In some examples, the UE 102 may wait until at least a first retry attempt to send the IMS message 204 to perform the watchdog timer initiation 206.

While the watchdog timer 114 is running, the UE 102 can attempt to send the IMS message 204 to the IMS 110 in association with the first IMS connection one or more times. For example, if the watchdog timer 114 was set for two minutes, the UE 102 can retry sending the IMS message 204 to the IMS 110 every ten seconds, or at any other interval, during the two minutes that the watchdog timer 114 is running. However, a watchdog timer expiration 208 can occur if the UE 102 does not receive a response to the initial IMS message 204, or any of the retried attempts to send the IMS message 204, by the time the watchdog timer 114 expires. The watchdog timer expiration 208 can indicate that the first IMS connection may be currently unusable by the UE 102, for instance due to a network-side issue with one or more elements of the access network 106, the core network 108, and/or the IMS 110 that prevented the IMS 110 from receiving the IMS message 204 and/or from returning a response to the IMS message 204.

In response to the watchdog timer expiration 208, the UE 102 can perform an airplane mode activation 210. The airplane mode activation 210 can turn off, or otherwise deactivate, one or more transmission interfaces 104 of the UE 102. The airplane mode activation 210 can cause the UE 102 to disconnect from the access network 106, and thereby disconnect from the core network 108 and the IMS 110, and to in turn become disassociated with the first IMS connection.

After performing the airplane mode activation 210, the UE 102 can perform an airplane mode deactivation 212. The airplane mode deactivation 212 can turn on, or otherwise activate, one or more transmission interfaces 104 of the UE 102. The airplane mode deactivation 212 can accordingly cause the UE 102 to reconnect to the access network 106, and in turn reconnect to the core network 108 and the IMS 110.

After the airplane mode deactivation 212, the UE 102 can engage in a second IMS registration 214 to register with the IMS 110. The second IMS registration 214 can be associated with a second IMS connection, different from the first IMS connection. For instance, in some examples, the second IMS registration 214 can cause the UE 102 to become associated with a different P-CSCF and/or a different S-CSCF than was associated with the UE 102 for the first IMS connection. The airplane mode deactivation 212 can also cause the UE 102 to establish a second communication session, such as a new PDU session or a new PDN connection, in the access network 106 and/or the core network 108 that is different from the first communication session used for the first IMS registration 202.

By establishing the second IMS connection and the second communication session after the airplane mode deactivation 212, the UE 102 can have access to IMS services via the second IMS connection and the second communication session. For example, if a network-side issue with the first IMS connection and/or the first communication session had prevented the IMS from responding to the IMS message 204, such a network-side issue may not exist with the second IMS connection and the second communication session. As such, the UE 102 can have access to IMS services via the second IMS connection and the second communication session after the second IMS registration 214, even if the network-side issue with the first IMS connection and/or the first communication session is still ongoing.

Example Architecture

FIG. 3 shows an example 300 of system architecture for the UE 102, in accordance with various examples. The UE 102 can have one or more transmission interfaces 104, as discussed above. The UE 102 can also have at least one memory 302, processor(s) 304, a display 306, output devices 308, input devices 310, and/or a drive unit 312 including a machine readable medium 314.

The transmission interfaces 104 can include transceivers, modems, interfaces, antennas, and/or other components that perform or assist in exchanging RF communications with base stations of the access network 106, a Wi-Fi access point, or otherwise implement connections with one or more networks. The transmission interfaces 104 can be compatible with one or more radio access technologies, such as 5G NR radio access technologies and/or LTE radio access technologies. The transmission interfaces 104 can also be at least partially controlled by the airplane mode manager 116, which can be configured to deactivate and activate the transmission interfaces 104 to control an airplane mode state of the UE 102.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 302 can include one or more software or firmware elements, such as computer-readable instructions that are executable by the one or more processors 304. For example, the memory 302 can store computer-executable instructions associated with the watchdog timer manager 112 and the airplane mode manager 116. The memory 302 can also store data associated with the watchdog timer 114, such as settings or configurations for the watchdog timer 114 and/or data associated with the watchdog timer 114 while the watchdog timer 114 is running. The memory 302 can also store other modules and data 316, which can be utilized by the UE 102 to perform or enable performing any action taken by the UE 102. The other modules and data 316 can include a UE platform, operating system, and applications, and data utilized by the platform, operating system, and applications.

In various examples, the processor(s) 304 can be a CPU, a graphics processing unit (GPU), or both CPU and GPU, or any other type of processing unit. Each of the one or more processor(s) 304 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 304 may also be responsible for executing all computer applications stored in the memory 302, which can be associated with types of volatile (RAM) and/or nonvolatile (ROM) memory.

The display 306 can be a liquid crystal display or any other type of display commonly used in UEs. For example, the display 306 may be a touch-sensitive display screen, and can thus also act as an input device or keypad, such as for providing a soft-key keyboard, navigation buttons, or any other type of input.

The output devices 308 can include any sort of output devices known in the art, such as the display 306, speakers, a vibrating mechanism, and/or a tactile feedback mechanism. Output devices 308 can also include ports for one or more peripheral devices, such as headphones, peripheral speakers, and/or a peripheral display.

The input devices 310 can include any sort of input devices known in the art. For example, input devices 310 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 314 can store one or more sets of instructions, such as software or firmware, that embodies any one or more of the methodologies or functions described herein. The instructions can also reside, completely or at least partially, within the memory 302, processor(s) 304, and/or transmission interface(s) 104 during execution thereof by the UE 102. The memory 302 and the processor(s) 304 also can constitute machine readable media 314.

Example Operations

Figure 4:
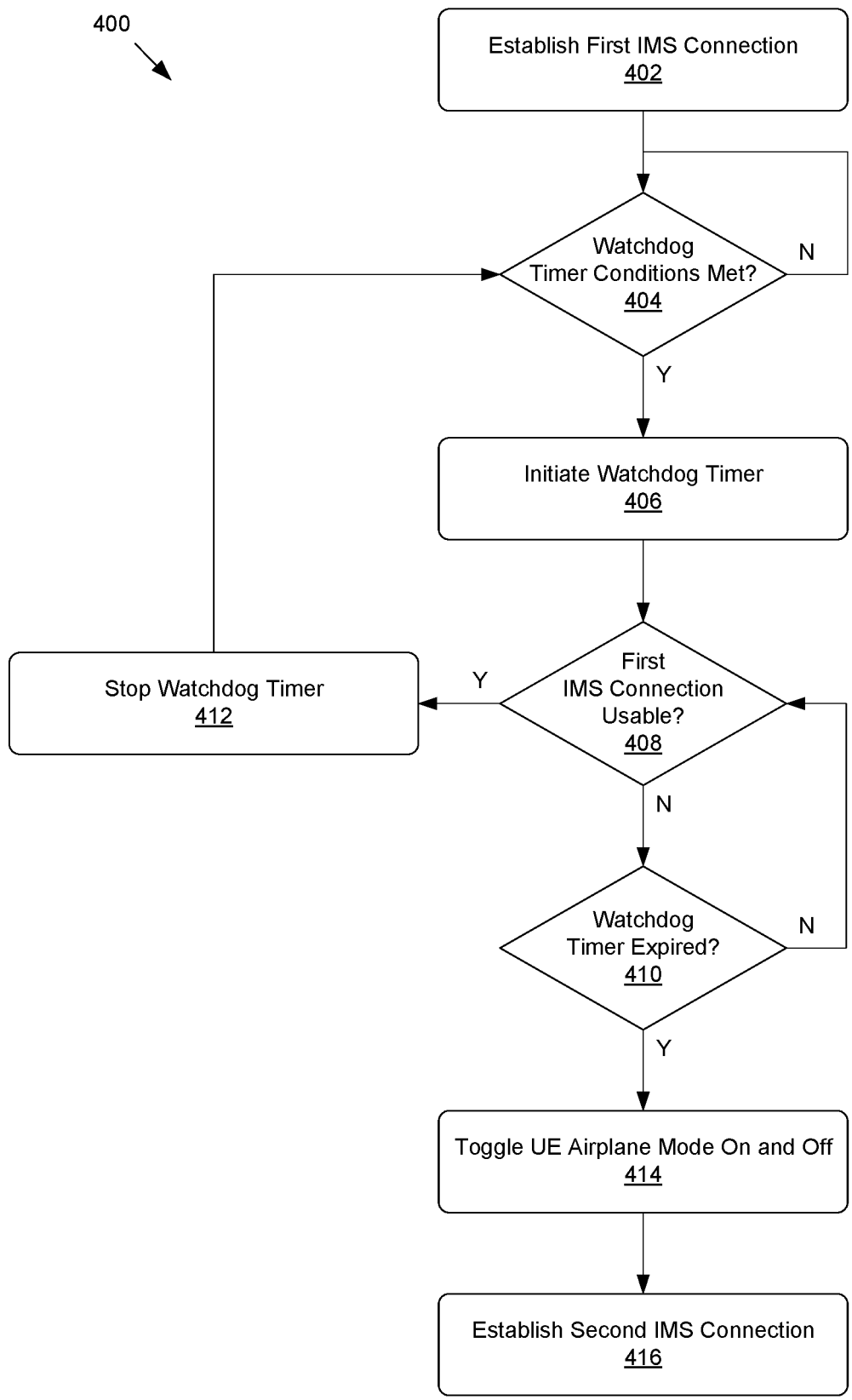
FIG. 4 shows a flowchart of an example method by which the UE can regain a usable IMS connection by toggling airplane mode on and off in response to an expiration of the watchdog timer.

FIG. 4 shows a flowchart of an example method 400 by which the UE 102 can regain a usable IMS connection by toggling airplane mode on and off in response to an expiration of the watchdog timer 114. At block 402, the UE 102 can establish a first IMS connection. For example, the UE 102 can initiate a first IMS registration procedure by sending a SIP REGISTER message to the IMS 110, and the IMS 110 can associate the UE 102 with particular elements of the IMS 110 during the first IMS registration procedure. The UE 102 can also establish a first communication session, such as a first PDU session or first PDN connection, through the access network 106 and core network 108 that the UE 102 can use to exchange data with the IMS 110 in association with the first IMS connection.

At block 404, the UE 102 can determine whether watchdog timer conditions have been met. In some examples, the watchdog timer conditions can be met when the UE 102 attempts to send a message to the IMS 110 in association with the first IMS connection, such as a SIP message, a heartbeat message, or other type of message. In other examples, the watchdog timer conditions can be met when the UE 102 determines that no response has been received from the IMS 110 to a previously-sent message, and the UE 102 attempt to retry sending that message to the IMS 110. In still other examples, the watchdog timer conditions can be any other messaging condition or IMS connection state that indicates that a network-side issue may be preventing the UE 102 and the IMS 110 from communicating with one another in association via the first IMS connection. For example, the network-side issue may be a problem with an element of the access network 106 or an element of the core network 108 that is disrupting use of the first communication session by the UE 102 and/or the IMS 110. As another example, the network-side issue may be a problem with an element of the IMS 110 itself that is preventing the IMS 110 from receiving data from the UE 102, from processing data associated with the UE 102, from sending data to the UE 102, and/or from performing other operations associated with the UE 102 in association with the first IMS connection.

If the UE 102 determines that the watchdog conditions have not been met (Block 404—No), for instance if the UE 102 has not yet attempted to send a message to the IMS 110 or has not attempted to re-send a message to the IMS 110, the UE 102 can wait until the UE 102 determines that the watchdog conditions have been met at block 404.

Once the UE determines that the watchdog conditions have been met (Block 404—Yes), the UE 102 can initiate the watchdog timer 114 at block 406. For example, if the watchdog conditions have been met because the UE 102 sent a message to the IMS 110, or retried sending a previously-sent message to the IMS 110, the UE 102 can set the watchdog timer 114 to two minutes, or another predetermined period of time, and begin running the watchdog timer 114.

At block 408, the UE 102 can attempt to determine whether the first IMS connection is usable while the watchdog timer 114 is running. For example, the UE 102 can determine whether a response is received from the IMS 110 to a message that had been sent by the UE 102, and/or periodically or occasionally attempt to re-send messages to the IMS 110 to determine if the IMS 110 responds to the re-sent messages. If the UE 102 receives a response from the IMS 110 to a message that had been sent by the UE 102, the UE can determine at block 408 that the first IMS connection is usable. The UE 102 can also determine, at block 410, whether the watchdog timer 114 has expired. If the watchdog timer 114 has not yet expired, the UE 102 can continue attempting to determine whether the first IMS connection is usable at block 408.

If the UE 102 does receive a response from the IMS 110 while the watchdog timer 114 is running (Block 410—No), the UE 102 can determine that the first IMS connection is usable (Block 408—Yes), and can stop the watchdog timer 114 at block 412. The UE 102 can return to block 404 to determine when the watchdog timer conditions are next met and the watchdog timer 114 can be reset and reinitiated at block 406.

However, if the UE 102 has not determined that the first IMS connection is usable (Block 408—No) by the time the watchdog timer 114 expires (Block 410—Yes), the UE 102 can determine that a problem may exist with the first IMS connection that may be impacting the ability of the UE 102 to communicate with the IMS 110. Accordingly, the UE 102 can toggle airplane mode on and off at block 414.

Toggling airplane mode on and off at block 414 can cause the transmission interfaces 104 of the UE 102 to temporarily and briefly deactivate, and then re-activate. For example, toggling airplane mode on at block 414 can cause the transmission interfaces 104 to deactivate for a period of one second, or any other relatively brief period of time sufficient for the transmission interfaces 104 to deactivate and disconnect from the telecommunication network. Toggling airplane mode off at block 414 can in turn cause the transmission interfaces 104 to re-activate and reconnect to the telecommunication network, such that the UE 102 can establish a second IMS connection at block 416 after the UE 102 has toggled airplane mode on and off at block 414.

At block 416, the UE 102 can establish a second IMS connection. For example, after toggling airplane mode off to re-activate the transmission interfaces 104, the UE 102 can reconnect to the access network 106 and the core network 108. In some cases, the UE 102 can connect to a different base station or access point than the UE 102 had been connected to prior to turning on airplane mode, and/or can become associated with different elements of the core network 108. After the UE 102 has reconnected to the access network 106 and core network 108, the UE 102 can also initiate a second IMS registration procedure by sending a new SIP REGISTER message to the IMS 110. The second IMS registration procedure can cause the IMS 110 to become associated with particular elements of the IMS 110 for the second IMS connection, which may in some cases be different than IMS elements that were associated with the UE 102 for the first IMS connection. The UE 102 can also establish a second communication session, such as a second PDU session or second PDN connection, through the access network 106 and core network 108 that the UE 102 can use to exchange data with the IMS 110 in association with the second IMS connection.

Accordingly, by toggling airplane mode on and off at block 414, in response to an indication that the first IMS connection may not be usable due to an expiration of the watchdog timer 114 at block 410, the UE 102 can establish the second IMS connection more quickly than waiting for the first IMS connection to become usable again. For example, deactivating and re-activating the transmission interfaces 104 by automatically toggling airplane mode on and off can cause the UE 102 to establish the second IMS connection with the IMS 110, such that the UE 102 can engage in, and/or have access to, IMS services via the second IMS connection relatively quickly rather than waiting for a network-side issue to be resolved that may be preventing the UE 102 and the IMS 110 from exchanging data via the first IMS connection.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   initiating, by a user equipment (UE), a timer in response to the UE sending a message to an Internet Protocol Multimedia Subsystem (IMS) in association with a first IMS connection;
   determining, by the UE, an expiration of the timer, based on the timer expiring without the UE receiving a response to the message from the IMS; and
   in response to determining the expiration of the timer, toggling, by the UE, an airplane mode of the UE on and off to cause the UE to disestablish the first IMS connection and establish the second IMS connection,
   wherein the toggling is performed without involvement from a user of the UE and without surfacing an indication that the airplane mode has been toggled on and off.

2. The method of claim 1, wherein the expiration of the timer occurs due to a network-side issue associated with the first IMS connection that prevents the IMS from providing the UE with the response to the message.

3. The method of claim 2, wherein the network-side issue is associated with at least one network element of one or more of: an access network, a core network, or the IMS.

4. The method of claim 2, wherein the second IMS connection is not associated with the network-side issue.

5. The method of claim 1, wherein the first IMS connection and the second IMS connection are associated with at least one different network element.

6. The method of claim 1, wherein the UE initiates the timer in response to a first attempt to send the message to the IMS.

7. The method of claim 1, wherein the UE initiates the timer in response to a retry attempt to send the message to the IMS.

8. The method of claim 1, further comprising toggling the airplane mode on and off, by the UE, a number of times up to a predefined airplane mode toggle attempt limit.

9. A user equipment (UE), comprising:
one or more processors;
a transmission interface; and
memory storing computer-executable instructions that, when executed by the one or more processors, cause the one or more processors to perform operations comprising:
initiating a timer in response sending a message to an Internet Protocol Multimedia Subsystem (IMS) in association with a first IMS connection;
determining an expiration of the timer, based on the timer expiring without a response to the message being received from the IMS; and
in response to determining the expiration of the timer, toggling, by the UE, an airplane mode of the UE on and off to cause the UE to disestablish the first IMS connection and establish the second IMS connection,
wherein the toggling is performed without involvement from a user of the UE and without surfacing an indication that the airplane mode has been toggled on and off.

10. The UE of claim 9, wherein the expiration of the timer occurs due to a network-side issue associated with the first IMS connection that prevents the IMS from providing the UE with the response to the message.

11. The UE of claim 9, wherein the timer is initiated in response to a first attempt to send the message to the IMS.

12. The UE of claim 9, wherein the timer is initiated in response to a retry attempt to send the message to the IMS.

13. The UE of claim 9, wherein the operations further comprise toggling the airplane mode on and off a number of times up to a predefined airplane mode toggle attempt limit.

14. One or more non-transitory computer-readable media storing computer-executable instructions that, when executed by one or more processors of a user equipment (UE), cause the UE to perform operations comprising:
initiating a timer in response sending a message to an Internet Protocol Multimedia Subsystem (IMS) in association with a first IMS connection;
determining an expiration of the timer, based on the timer expiring without a response to the message being received from the IMS; and
in response to determining the expiration of the timer, toggling, by the UE, an airplane mode of the UE on and off to cause the UE to disestablish the first IMS connection and establish the second IMS connection,
wherein the toggling is performed without involvement from a user of the UE and without surfacing an indication that the airplane mode has been toggled on and off.

15. The one or more non-transitory computer-readable media of claim 14, wherein the timer is initiated in response to a first attempt to send the message to the IMS.

16. The one or more non-transitory computer-readable media of claim 14, wherein the timer is initiated in response to a retry attempt to send the message to the IMS.

17. The one or more non-transitory computer-readable media of claim 14, wherein the operations further comprise toggling the airplane mode on and off a number of times up to a predefined airplane mode toggle attempt limit.

* * * * *